(12) United States Patent
Pfister et al.

(10) Patent No.: US 10,502,661 B2
(45) Date of Patent: Dec. 10, 2019

(54) METHOD AND DEVICE FOR PERFORMING A TEST RUN ON A TEST STAND

(71) Applicant: AVL LIST GmbH, Graz (AT)

(72) Inventors: Felix Pfister, Graz (AT); Martin Schmidt, Langen (DE); Clemens Reitze, Karlsruhe (DE)

(73) Assignee: AVL LIST GmbH, Graz (AT)

( * ) Notice: Subject to any disclaimer, the term of this patent is extended or adjusted under 35 U.S.C. 154(b) by 221 days.

(21) Appl. No.: 15/536,379

(22) PCT Filed: Dec. 22, 2015

(86) PCT No.: PCT/EP2015/080954
§ 371 (c)(1),
(2) Date: Oct. 4, 2017

(87) PCT Pub. No.: WO2016/102555
PCT Pub. Date: Jun. 30, 2016

(65) Prior Publication Data
US 2018/0143101 A1    May 24, 2018

(30) Foreign Application Priority Data

Dec. 22, 2014   (AT) .............................. A 50938/2014

(51) Int. Cl.
*G01M 17/007*     (2006.01)
*G01M 13/025*     (2019.01)
*G01D 1/16*       (2006.01)

(52) U.S. Cl.
CPC .............................. *G01M 17/0074* (2013.01)

(58) Field of Classification Search
CPC ..... B60C 19/00; B60C 23/061; B60C 99/006; G01M 13/025; G01M 17/0074;
(Continued)

(56) References Cited

U.S. PATENT DOCUMENTS 4,986,114 A * 1/1991 Rothmann .............. G01L 5/282
73/115.01
6,549,842 B1   4/2003 Hac et al.
(Continued)

FOREIGN PATENT DOCUMENTS

AT        11001 U2    2/2010
AT       514144 A2   10/2014
(Continued)

OTHER PUBLICATIONS

Austrian Search Report Application No. A50938/2014 dated Dec. 9, 2015 1 Page.
(Continued)

*Primary Examiner* — Brandi N Hopkins
(74) *Attorney, Agent, or Firm* — Whitmyer IP Group LLC

(57) ABSTRACT

To make the handling of a tire model for controlling a test run on a test bench simpler and more flexible and thus more practicable, it is provided that at least one longitudinal velocity of a tire is calculated in a first simulation unit with a first simulation model, and the longitudinal velocity is provided to a second simulation unit, and a longitudinal force and/or a rolling resistance torque of the tire are calculated with a second simulation model in the second simulation unit on the basis of the longitudinal velocity, and said longitudinal force and/or rolling resistance torque are used to calculate at least one target dyno value for a drive control unit of a load machine of the test bench.

20 Claims, 4 Drawing Sheets

(58) Field of Classification Search
CPC .............. G01M 15/044; G06F 17/5018; G06F 17/5095; B60T 2270/86; G01D 1/16
See application file for complete search history.

(56) References Cited

U.S. PATENT DOCUMENTS

| | | | |
|---|---|---|---|
| 6,754,615 B1 | 6/2004 | Germann et al. | |
| 8,281,653 B2* | 10/2012 | Schrotter | G01M 15/044 73/116.01 |
| 2010/0005875 A1* | 1/2010 | Pickl | G01M 15/044 73/116.02 |
| 2015/0219529 A1* | 8/2015 | Akiyama | G01M 13/025 73/115.01 |

FOREIGN PATENT DOCUMENTS

| | | |
|---|---|---|
| DE | 102008041883 A1 | 3/2010 |
| DE | 102010049687 A1 | 5/2011 |
| DE | 102010049689 A1 | 5/2011 |
| EP | 1037030 A2 | 9/2000 |
| JP | 2000329656 A | 11/2000 |
| JP | 2004053614 A | 2/2004 |
| JP | 2004053615 A | 2/2004 |
| WO | 2014010409 A1 | 1/2014 |

OTHER PUBLICATIONS

European International Search Report & Written Opinion Application No. PCT/EP2015/080954 Completed: Mar. 9, 2016; dated Mar. 18, 2016 11 Pages.
Chinese Office Action and Translation Application No. 201580075567.8 dated Jul. 7, 2019 19 Pages.

* cited by examiner

METHOD AND DEVICE FOR PERFORMING A TEST RUN ON A TEST STAND

TECHNICAL FIELD

The present invention relates to a method for performing a test run on a test bench, wherein a test specimen is loaded by a load machine, and the load machine is controlled by a drive control unit, and the drive control unit for controlling the load machine uses at least one target dyno value that is to be set, wherein the at least one target dyno value is calculated from a simulation, and the invention also relates to an associated device for controlling a test bench for performing a test run.

BACKGROUND

In order to perform realistic test runs on test benches for the testing of vehicles or vehicle components (test specimens), such as a vehicle, a drive train, an internal combustion engine, a transmission, a traction battery, etc., the tests have increasingly employed simulations of the vehicle, the test track, the vehicle environment, the interaction between vehicle and driving surface and the driver on the basis of suitable simulation models so that target values, such as speeds, torques, currents, voltages, etc. can be calculated for a test specimen on the test bench and for a load machine that is linked to it. This means that the test specimen is physically constructed on the test bench and is loaded by a load machine, e.g. by a torque or a speed. The vehicle, or a portion thereof, in which the test specimen is used is thereby simulated by simulation models, and the simulation supplements the physically constructed test specimen on the test bench for the test run. The term 'test run' is generally understood to mean loading the test specimen with a load variation with time via an interface, e.g. in the form of a torque-time diagram or torque-speed diagram. The objective of this is, for instance, to drive over a test route with the test specimen, wherein the test specimen is arranged on the test bench—the test specimen is thus intended to experience the same load as if the test specimen were really driving on the test route in a real vehicle.

When using simulation models for the test run, the target values for the test run are calculated from the simulation models at usually constant intervals, e.g. at a frequency of 1 kHz, in real time and are adjusted on the test bench by the test specimen and the load machine. Additionally, particular measurement values, such as torques and speeds, are detected by measurement on the test bench and processed in the simulation. However, for more highly dynamic control processes, such as braking maneuvers or quick acceleration, shorter intervals of time are desirable and necessary for realistic test runs. Nevertheless, limits are reached very quickly because of the available computing capacity, since the target values cannot be calculated fast enough. Cycle times of up to 10 kHz or more are required for the control process to create highly dynamic, realistic applications, which is currently not economically feasible with sufficient precision. One must either simplify the simulation model in order to get by with the available computing capacity or be satisfied with large time intervals in the control process. In practice, however, both of these options are not satisfactory for highly dynamic processes.

In particular, realistically taking into account the behavior between the tires and the driving surface, e.g. tire slippage, places high demands on the simulation. In this regard, EP 1 037 030 B1 discloses a method that permits the behavior of the vehicle on a driving surface to be simulated as realistically as possible. In so doing, the slipping behavior of the tire is calculated based on a tire model in a simulation unit. The tire model provides a torque, which is given as a target value to the load machine simulating the tire on the test bench and which is adjusted on the test bench, and a longitudinal force, which is transferred from the tire to the driving surface and which is processed in a vehicle model to calculate the vehicle velocity. The tire behavior is thus simulated entirely on a simulator computer. The possible dynamics are determined by the capacity of the simulation computer and/or by the complexity of the simulation model. Control cycle times of 1-3 kHz are typically possible using this method, but this is insufficient for realistic, highly dynamic test runs.

Maintaining a tire model such as the one in EP 1 037 030 B1 is relatively laborious, though, since the entire tire model can become highly complex. Apart from this, modifying or adapting the tire model, even a part of it, is also difficult for the same reasons. Not least of all, the tire model is also inflexible, since the implemented model is firmly established. If one wishes to use a different tire model or another part of the tire model, e.g. to calculate the transverse force or tire slippage, the entire tire model must be exchanged or adapted.

Therefore, the problem addressed by the present invention is that of making the handling of a tire model for controlling a test run on a test bench simpler and more flexible and thus more practicable.

SUMMARY

According to the invention, this problem is solved by the aforementioned method in that at least one longitudinal velocity of a tire is calculated in a first simulation unit with a first simulation model, and the longitudinal velocity is provided to a second simulation unit, which uses a second simulation model to calculate a longitudinal force and/or a rolling resistance torque of the tire based on the longitudinal velocity, and said longitudinal force and/or rolling resistance torque are used to calculate at least one target dyno value for the drive control unit. Dividing the simulation model into a separate first simulation model and a second simulation model achieves a functional abstraction and a modularization, which allow the individual simulation models or sub-models to be parameterized, maintained or adapted independently of each other. This can now take place in a significantly more manageable way, since the individual simulation models are separate from each other and each of them covers only certain partial aspects of the simulation of the tire. Owing to the established interfaces between the simulation models, one simulation model does not have to have any awareness of the other simulation model. This in turn makes it possible to use simulation models from different manufacturers or to combine a particular simulation model with various other simulation models. Moreover, the manufacturers of the simulation models do not require any competence in matters relating to the machine dynamics of the load machine or the test bench, and they do not need to involve themselves in this subject, since only one interface is provided for this purpose, which can be used on the test bench. Interfaces adapted to the problem are thus obtained. The integration of complex simulation models and the simulation environment into test benches is likewise simplified in this way.

Similarly, this problem is solved by a device for controlling a test bench for carrying out a test run, in which a first simulation unit with a first simulation model and a second simulation unit with a second simulation model are provided, wherein the first simulation model is configured to calculate at least one longitudinal velocity of a tire and provide it to the second simulation unit, and the second simulation unit is configured to calculate a longitudinal force and/or a rolling resistance torque of the tire based on the longitudinal velocity and to calculate at least one target dyno value for the drive control unit from that information.

With the claimed approach, a simulation model can also be a complex as desired. In particular, other values can also be calculated in the first simulation unit, such as a vertical force, a transverse force, a drilling torque or a tilting torque of the tire. These values can be transferred to the second simulation unit via the provided interface in order to calculate the longitudinal force and/or the rolling resistance torque or the target dyno value for the drive control unit.

If the at least one target dyno value for the drive control unit is calculated from the longitudinal force and/or rolling resistance torque in the second simulation unit, then a target load torque or a target dyno speed can be provided directly to the drive control unit. Thus the drive control unit also does not need to have any awareness of a simulation model. This allows any given drive control unit to be used on the test bench, and especially without having to adapt it.

A further problem addressed by the present invention lies in improving the issue of the limited dynamics possible in performing a test run on a test bench with a simulation model. According to the invention, this problem is solved in that at least one of the values longitudinal velocity, vertical force, transverse force, drilling torque and tilting torque is calculated in the first simulation unit at a first frequency, and the longitudinal force and/or the rolling resistance torque are calculated from these values in the second simulation unit at a second frequency. Preferably, a first frequency is shorter than the second frequency. The wrench values of the tire that are necessary to achieve high test bench dynamics are thus calculated more frequently than the longitudinal velocity and the other wrench values. Because the simulation model is divided, the available computing capacity in the second simulation unit is sufficient. The values calculated in the first simulation unit can be updated, i.e. calculated, less often without any limits on the quality of the simulation. In particular, this permits highly dynamic test runs to be performed on test benches, in which a test specimen is connected to a load machine that is controlled by a drive control unit.

When the second simulation model is implemented in the drive control unit, a possible down time for the technical transmission of values between the second simulation unit and the drive control unit is reduced. By implementing the second simulation model close to the converter, it is possible to calculate the target dyno value even faster.

The precision of the simulation model can be increased by defining correction terms that correct the values longitudinal force and/or rolling resistance torque as a function of a current camber and/or current skew of the tire. This also allows the test bench to simulate cornering. It likewise leads to an increase in the precision of the simulation when a tire slippage, which depends on the longitudinal force, is taken into account in the first simulation model and/or in the second simulation model.

The claimed method can also be employed advantageously on a roller test bench, in which at least one tire is frictionally connected with a roller driven by the load machine. In so doing, a roller torque of the roller is advantageously measured, since this measured value is normally available on a roller test bench. In the second simulation unit, the longitudinal force or the rolling resistance torque is then calculated from the second simulation model, and the other value is calculated from an equation of motion (such as the Eulerian equation of motion). Calculating the longitudinal force or the rolling resistance torque can thus be simplified.

The roller test bench can advantageously also be used to adapt the frictional connection of the roller as a friction gear by means of a shuffle speed calculated as a target dyno value, i.e. a particular circumferential speed of the tire tread or the conveyor belt.

BRIEF DESCRIPTION OF THE DRAWINGS

The present invention is explained below in greater detail on the basis of FIGS. 1 through 5, which portray advantageous embodiments of the invention in an exemplary, schematic and non-limiting way. The following is shown.

DETAILED DESCRIPTION

Figure 1:
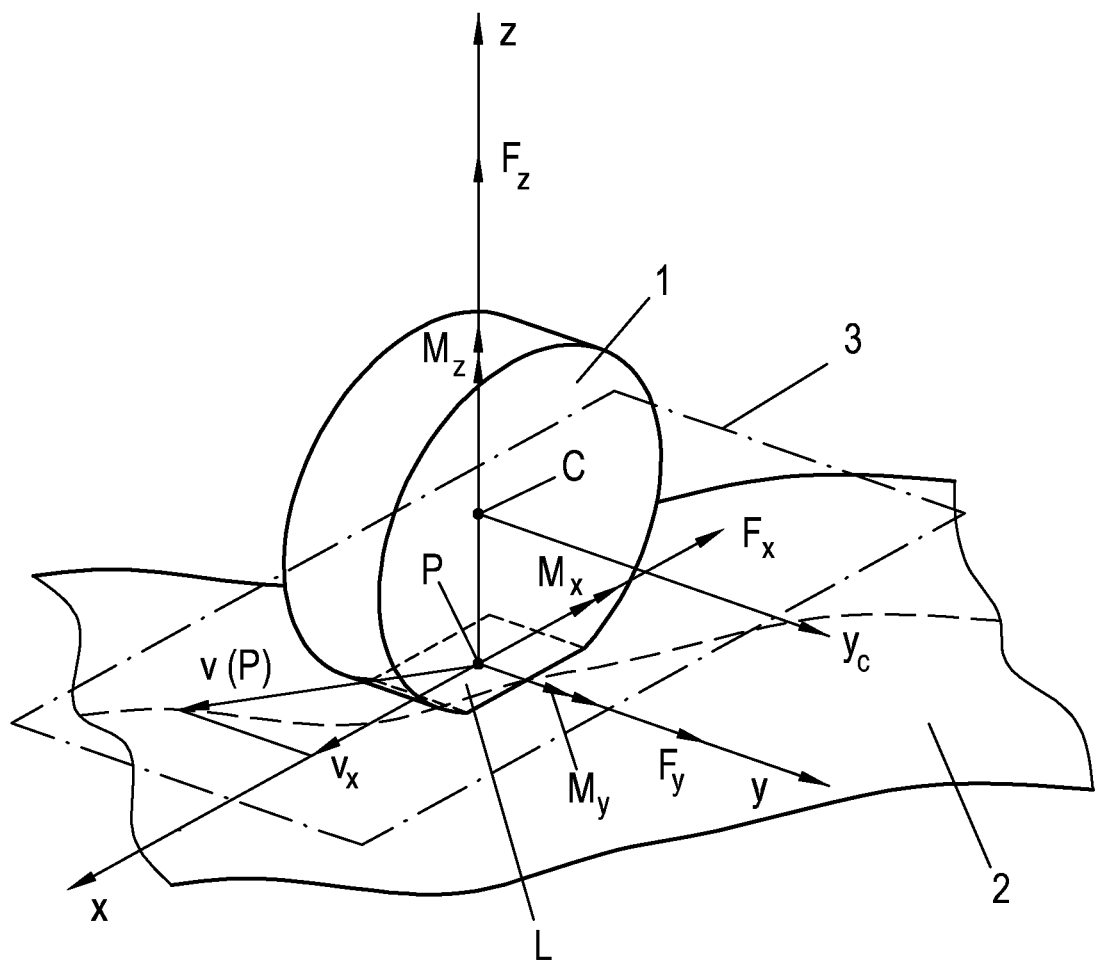
FIG. 1 shows a tire on a cambered driving surface with a tire-oriented coordinate system.

In FIG. 1, a tire 1 is schematically represented on a driving surface 2 that is generally cambered. The tire 1 stands on wheel contact point P on the driving surface 2 (FIG. 1 shows the tangential plane 3 on the cambered driving surface 2 in the wheel contact point P) and the tire 1 rotates around the center point C of the wheel on a rotary axis $y_c$. The tire 1 does not contact the driving surface 2 at a point P, but rather on a tire contact surface, which is commonly known as the tread shuffle L. For the following considerations, a right-handed coordinate system is assumed, as is shown in FIG. 1. The x axis corresponds to the tread of the tire 1. The y axis is the parallel of the rotary axis $y_c$ through the wheel contact point P, and the z axis represents the connecting line through the wheel contact point P and the wheel center point C. Thus the wheel contact point P is that point which minimizes the distance between the cambered driving surface 2 and the wheel center point C. According to the selected coordinate system, a vertical force $F_z$, a longitudinal force $F_x$ in the direction of the tread and a transverse force $F_y$, a rolling resistance torque $M_y$, a drilling torque $M_z$ and a tilting torque $M_x$ arise on the tire 1. Taken together, these forces and torques are also called the tire "wrench" (=second type of screw or dyname). As an intrinsic physical value, the tire wrench is independent of the breakdown into a particular coordinate system. The velocity of the wheel contact point P of the virtual vehicle observed in a coordinate system that is fixed to the driving surface is denoted with V(P). The projection of V(P) onto the tread is called the longitudinal velocity and is abbreviated $v_x$.

Figure 2:
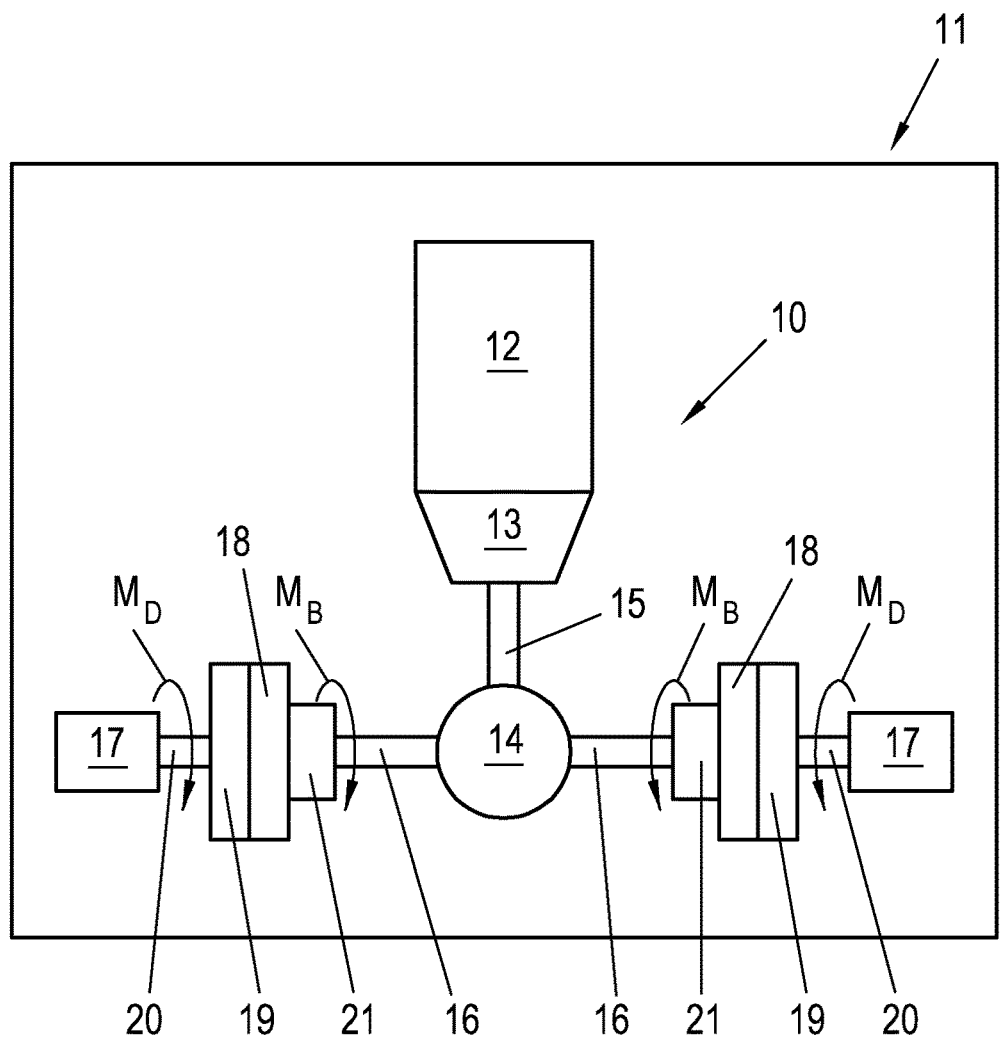
FIG. 2 shows an example of a drive train test bench.

The arrangement of a test specimen 10, in this case a drive train, on a test bench 11, in this case a drive train test bench, is shown as an example in FIG. 2. The test specimen 10 is physically constructed as real hardware on the test bench 11. Here the drive train comprises a drive unit 12 such as an internal combustion engine or an electric motor, which drives a gearing mechanism 13. A drive shaft 15 connects the gearing mechanism 13 with a differential gear 14 that propels two side shafts 16 in a known way. The vehicle wheel with the tire 1 is normally arranged on the wheel carriers 18 on the side shaft 16. On the present test bench 11, the vehicle wheel is replaced by a load machine 17, which is usually an electric motor that is connected to the wheel carriers 18 in a suitable manner, e.g. in a form-fitting way with a connecting flange 19 and a dyno shaft 20, and which is also called a dynamometer or a dyno for short. The drive train is therefore characterized in that it creates a form-fitting connection between the test specimen and load machine 17. A braking system 21 is likewise usually provided in order to impose a braking torque $M_B$ onto the drive train for braking. Even more torques could also be effective in the drive train, such as a torque of a wheel hub motor or an electric motor in a hybrid drive train, which generate a further driving torque.

For the invention, it is important to understand that only one portion of the forces and torques of the tire wrench influences the rotational movement of the tire 1 about the rotary axis $y_c$, which in turn directly influences the drive train and the test specimen 10, and the other portion of the tire wrench, which is orthogonal thereto within the meaning of screw theory, influences the driving dynamics of the vehicle in which the drive train is virtually (by simulation) or actually installed. Only the longitudinal force $F_x$ and the rolling resistance torque $M_y$ of the tire wrench influence the rotational movement of the tire 1 about the rotary axis $y_c$. All other values of the tire wrench are orthogonal to the twist within the meaning of screw theory and do not exert a direct influence on the rotational movement of the tire 1, but instead act upon the wheel suspension and thus the vehicle.

The simulation and control concept of the test bench 11 will be explained in greater detail below on the basis of FIG. 3. The test specimen 10, such as a drive train as shown in FIG. 2, is physically constructed on the test bench 11. The test specimen 10 is connected with a plurality of load machines 17 and is loaded by it, e.g. with a load torque $M_d$. For the sake of simplicity, however, only one load machine 17 will be assumed from here on. The test specimen 10 can be controlled by an automation unit 37 of the test bench 11 according to the specifications of the test run that is to be performed; for example, a throttle valve of an internal combustion engine 12 can be controlled by the automation unit 37 such that said automation unit 37 calculates target values for the test specimen $S_p$, e.g. a speed and/or torque, for the test specimen 10. Additionally, the automation unit 37 can obtain simulation values G calculated in a simulation unit 30, as is explained below.

The load machine 17 is controlled on the test bench 11 by a drive control unit 34. For this purpose, the drive control unit 34 is provided with a target load torque $M_{D,soll}$ or equivalently a target dyno speed $n_{D,soll}$ (generally a target dyno value $S_D$), which is to be adjusted by the drive control unit 34. It is also possible that the drive control unit 34 for controlling the load machine 17 and/or the test specimen 10 obtains measurement values MW, such as the actual speed or actual torque, which can be detected by means of suitable sensors on the test specimen 10 or on the load machine 17. The target dyno value $S_D$ is determined in the simulation for this purpose, as is explained below.

A first simulation model 31 is implemented in a first simulation unit 30, e.g. a simulation computer with simulation hardware and simulation software, in this case e.g. with sub-models in the form of a vehicle model 32 and a first tire model 33. Using the first simulation model 31, in particular the first tire model 33 in this case, the forces and torques of the tire wrench are calculated which do not directly influence the rotational movement of the tire 1 about its rotary axis $y_c$, as is explained above, i.e. at least one of the values vertical force $F_z$, lateral force $F_y$, tilting torque $M_x$ and drilling torque $M_z$. From this, the values that influence the lateral dynamics of the tire 1, especially a lateral force $F_y$, and/or a drilling torque $M_z$, can also be fed back into the vehicle model 32 that processes these values for the simulation of the virtual vehicle, as indicated in FIG. 3.

The vehicle model 32 can calculate a current vehicle velocity V(P) for the individual vehicle wheels (or for the entire vehicle in the case of a simplification) and provide it to the first tire model 33 for further processing.

In particular, the longitudinal velocity $v_x$ of the wheel contact point P of the tire 1 is calculated in the first simulation model 31. This can occur either in the vehicle model 32 or in the first tire model 33. It is also possible, however, that the simulation model 31 does not include any sub-models in the form of a vehicle model 32 or a first tire model 33. In such a case, the longitudinal velocity $v_x$ is calculated directly by means of the first simulation model 31. This calculated longitudinal velocity $v_x$ of the wheel contact point P is provided to a second simulation unit 35 for further processing.

In addition, further values of the wrench (vertical force $F_z$, lateral force $F_y$, tilting torque $M_x$ or drilling torque $M_z$) calculated in the first simulation unit 30 or other values (e.g. geometric, kinematic values or technical characteristics of the driving surface (such as coefficients of friction) can be provided to the second simulation unit 35 for further processing, if necessary.

In the second simulation unit 35, e.g. a second simulation computer with simulation hardware and simulation software, a second simulation model 36, in particular a second tire model, is then implemented that calculates the forces and torques of the tire wrench which directly influence the rotational movement of the tire 1 about its rotary axis $y_c$, i.e. the longitudinal force $F_x$ and/or rolling resistance torque $M_y$. For this purpose, the second simulation unit 35 utilizes at least the longitudinal velocity $v_x$ obtained from the first simulation unit 30, and possibly also other received values such as vertical force $F_z$, lateral force $F_y$, tilting torque $M_x$ or drilling torque $M_z$, geometric or kinematic values (such as skew angle or lateral velocities) or values relating to the technical characteristics of the driving surface. As is known from tire physics, longitudinal force $F_x$ is substantially dependent upon the kinematic values of the longitudinal velocity $v_x$ of the wheel contact point P, but possibly also upon values of the wrench, such as the vertical force $F_z$, from which it is possible to derive a simple model to determine the longitudinal force $F_x$. The target dyno value $S_D$, here e.g. the target load torque $M_{D,soll}$ or the target dyno speed $n_{D,soll}$, for the drive control unit 34 is calculated from the longitudinal velocity $v_x$ and possibly from other required values, such as the values of the wrench or the skew angle or the camber of the type 1, which can be calculated in the vehicle model 32.

This occurs, for instance, with an equation of motion, such as the Eulerian equation of motion in the form $$J_w \ddot{\alpha} = M_y + F_x r + M_B + M_A + M_{aux}$$

with the following values:

mass moment of inertia of the vehicle wheel $J_w$, rotational acceleration $\ddot{\alpha}$ with rotation angle $\alpha$ (which can be measured), rolling resistance torque $M_y$, longitudinal force $F_x$, radius of the vehicle wheel r, braking torque $M_B$, driving torque $M_A$, which is imposed e.g. by the internal combustion engine 12 onto the drive train, and arbitrary additional torques $M_{aux}$, such as frictional torques, air resistance torque, etc. Where appropriate, the torques are signed as algebraic values. The values braking torque $M_B$ and driving torque $M_A$ are either measured or are known from the test run, or they are calculated or estimated from other values measured on the test bench 11.

Figure 3:
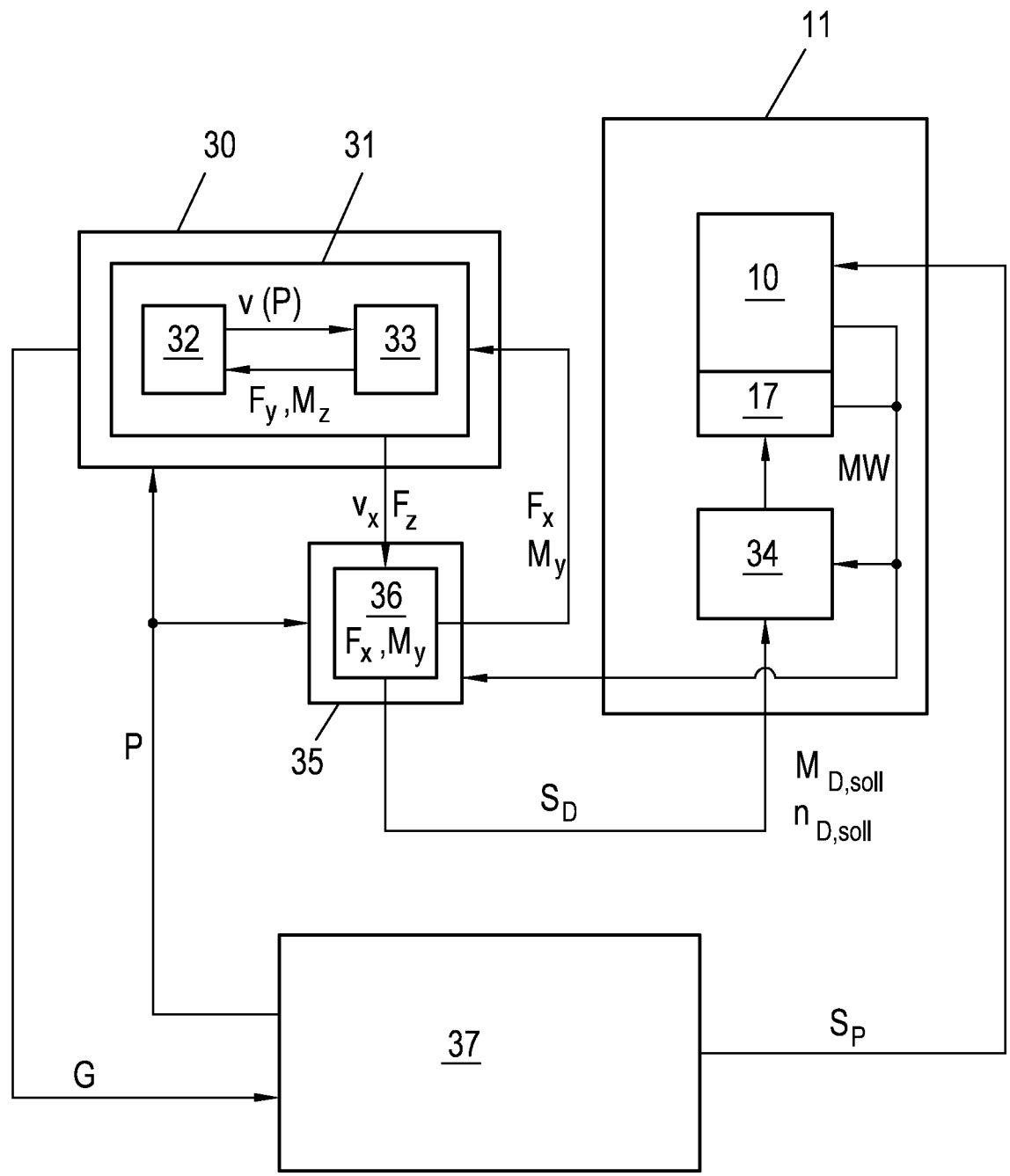
FIG. 3 shows a claimed control concept of the test bench.

In the embodiment shown in FIG. 3, the longitudinal velocity $v_x$ and the vertical force $F_z$ are calculated in the first tire model 33 and are provided to the second simulation unit 35. A lateral force $F_y$ and a drilling torque $M_z$ are likewise calculated in the first tire model 33 and passed back to the vehicle model 32. Apart from this, the values of the wrench calculated in the second simulation unit 35, such as the longitudinal force $F_x$ and/or the rolling resistance torque $M_y$, can also be fed back to the first simulation model 31, as is shown in FIG. 3.

To determine the target dyno value $S_D$, calculating just one of the two values longitudinal force $F_x$ or rolling resistance torque $M_y$ can be sufficient in an approximation. For example, a rolling resistance torque $M_y=0$ can be assumed, or only a rolling resistance torque $M_y$ could be considered. The above equation of motion would then adapt itself accordingly.

To do so, the first simulation unit 30 and/or the second simulation unit 35 can also obtain parameters P required for the simulation, such as driving surface parameters, environment parameters or tire parameters, from the automation unit 37 in accordance with the test run that is to be performed.

Likewise, the first and/or second simulation unit can obtain measured values MW for the simulation, like speeds and torques, from the test bench 11, as is shown in FIG. 3.

An essential advantage of dividing the simulation model for calculating the target dyno value $S_D$ into a separate first simulation model 33 and a second simulation model 36 can be seen in the principle of functional abstraction and modularization. The manufacturers of the first and second simulation units 30, 35 and the simulation models 31, 36 implemented on them, which can be different manufacturers and which, generally speaking, do not require any competence in matters relating to the machine dynamics of the load machine 17 or the test bench 11, do not need to involve themselves in this subject, since only one interface is provided for this purpose, which can be used on the test bench 11. Interfaces adapted to the problem are thus obtained. The integration of complex simulation models 31, 36 and the simulation environment into test benches 11 is likewise simplified in this way. In addition, the second simulation unit 35 is often already completely implemented and available on a test bench 11. This available interface can then easily be combined with first simulation units 30 from different manufacturers. This is a valuable contribution in view of the openness of simulation and test bench systems required by many users.

A further important advantage of the division of the simulation model into a separate first simulation model 33 and a second simulation model 36, which are implemented in different simulation units 30, 35, lies in the fact that the values of the tire wrench, which are responsible for the rotational movement of the tire 1 and thus for the dynamics, can be calculated in smaller increments of time than the other values. For instance, the values of the tire wrench that are responsible for the rotational movement of the tire 1, namely longitudinal force $F_x$ and/or rolling resistance torque $M_y$, are calculated in the second simulation unit 35 at a frequency of 10 kHz, while the longitudinal velocity $v_x$ is calculated in the first simulation unit 30 at a frequency of 1 kHz. Thus the target dyno value $S_D$ necessary for controlling the load machine 17 is provided in smaller time increments (higher frequency), which allows for a more finely time-resolved control of the load machine 17 and thus permits the control of highly dynamic control processes. Added to this is the fact that the longitudinal force $F_x$ and/or the rolling resistance torque $M_y$ are calculated closer to the drive control unit 34, whereby down times for the transmission of the target dyno value $S_D$ to the drive control unit 34 can be reduced, which is likewise advantageous for highly dynamic calculations. The values calculated in the first simulation unit 30 are calculated in larger increments of time, e.g. at a frequency of 1 kHz. For the second simulation unit 35, the values obtained from the first simulation unit 30, especially the longitudinal velocity $v_x$ and possibly values of the wrench, are updated with larger time increments (lower frequency) than the second simulation unit 35 calculates the target dyno values $S_D$. This does not represent a problem for performing the test run, though. In general, the second simulation unit 35 feeds the calculated values longitudinal force $F_x$ and/or rolling resistance torque $M_y$, and possibly other values, back to the first simulation unit 30.

Figure 4:
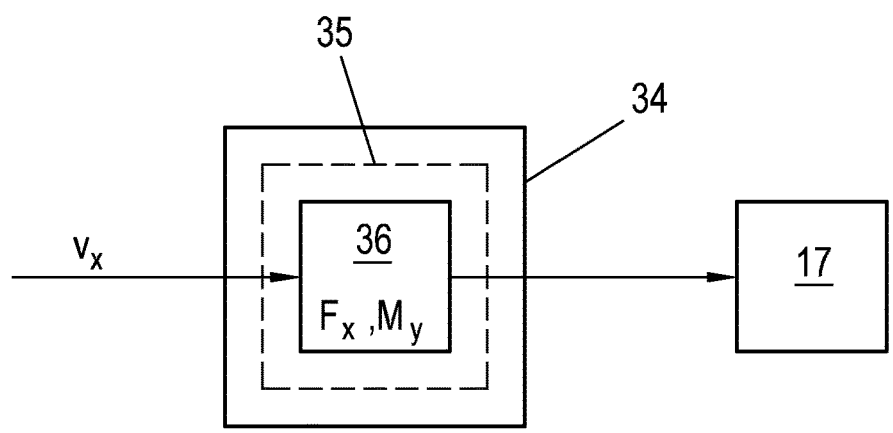
FIG. 4 shows an advantageous development of the control concept.

In an especially preferred embodiment, the second simulation model 36 is implemented in the drive control unit 34, which in this case also functions as a second simulation unit 35, as is shown in FIG. 4. In this way, the target dyno value $S_D$ can be calculated directly in the drive control unit 34, which in particular also even further reduces possible down times brought about by necessary data transmission between the second simulation unit 35 and the drive control unit 34. Any test bench solutions that might already be established can also be retrofitted in this way by supplementing the existing drive control unit 34 on the test bench 11 with the second simulation model 36. The available computing capacity of the provided drive control unit 34 is usually sufficient to calculate the values of the tire wrench that are responsible for the rotational movement of the tire 1, namely longitudinal force $F_x$ and/or rolling resistance torque $M_y$.

However, the claimed approach of separately calculating the longitudinal velocity $v_x$ and longitudinal force $F_x$ and/or rolling resistance torque $M_y$ does not necessarily require a test specimen 10 on the test bench 11, in which only the tires 1 are missing, as is shown in the drive train according to FIG. 1. Naturally, the invention could also be applied to other test specimens 10. If, for instance, the test specimen is only an internal combustion engine 12 on an engine test bench that is connected to a load machine 17, realistic tests can still be carried out. Additionally, the longitudinal velocity $v_x$, and possibly values of the tire wrench that do not influence the rotational movement of the tire 1, are calculated in a first simulation unit 30 with a first simulation model 31, as is described above. The second simulation model 36 can be used in a second simulation unit 35 or in the drive control unit 34 to calculate the values of the tire wrench that influence the rotational movement of the tire, i.e. the longitudinal force $F_x$ and/or the rolling resistance torque $M_y$. In order to determine a target dyno value $S_D$ for the load machine 17 in this case, the components of the drive train between the internal combustion engine 12 and tire 1 could likewise be simulated, preferably in the second simulation unit 35 or the drive control unit 34.

On the other hand, dividing the calculation of values of the tire wrench according to the invention can also be applied in a roller test bench, i.e. when the tire 1 is not actually present on the test bench 11, as is described below with reference to FIG. 5.

Figure 5:
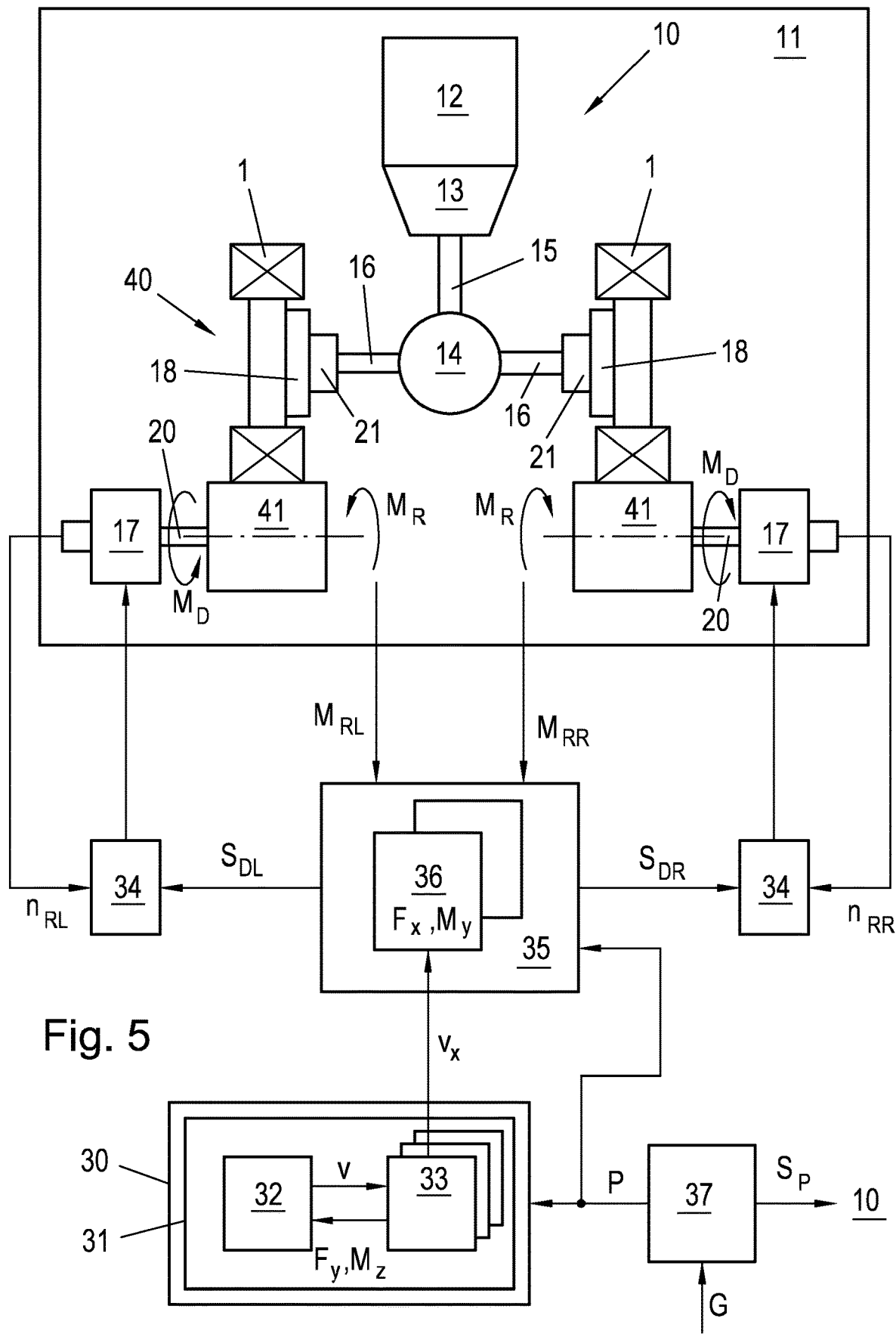
FIG. 5 shows an example of a roller test bench.

In FIG. 5, a drive train such as the one described in FIG. 2 is arranged on a test bench 11 in the form of a roller test bench. Here, vehicle wheels 40 with the tires 1 on the wheel carriers 18 are arranged on the test specimen 10. Rollers 41 are arranged on the test bench 11, and the vehicle wheels 40 bear upon the rollers via the tread shuffle L of the tires 1 (see FIG. 1). Although each vehicle wheel 40 is provided with its own roller 41 in the embodiment shown, it is of course also possible for only one roller 41 to be provided for multiple vehicle wheels 40, especially on one axle. For an all-wheel drive train, four rollers 41 or one roller 41 each can also be provided per axle. Each roller 41 is driven by an associated load machine 17. A roller test bench is a friction gear and is thus an example of a frictional drive design. In this design, the tire 1 rolls frictionally over the roller 41 and is hereby loaded by means of the load machine 17. The loading is carried out either by a load torque $M_D$ or by imposing a (target) torque onto the tire 1 in a frictional way. As has long been known from the theory of the friction gear, forces and torques in the tread shuffle L lead to tire slippage in the contact zone between the tire 1 and the roller 41. Roller test benches and friction gears such as these have long been known, which is why they will not be discussed in greater detail here. Accordingly, the roller 41 is a means for imposing a particular shuffle speed or a speed of the conveyor belt or tire tread onto the tire 1 by means of a frictional connection. However, this shuffle speed is not purely kinematically coupled to the vehicle velocity by force laws. The vehicle velocity is not identical to the tangential velocity of the roller surface: For example, the tire tread of the tire 1 or the tread shuffle L can spin on a sheet of ice, while the vehicle is at a standstill with 100% tire slippage. The roller 41 is not at a standstill in the simulation of this driving maneuver.

As was already explained with reference to FIG. 3, the control of the test specimen 10, e.g. the internal combustion engine 12, is again carried out by means of the automation unit 37 of the test bench 11, which again can obtain measured values MW from the test bench (not drawn in FIG. 5 for reasons of clarity). A drive control unit 34 can be added as a measured value MW, e.g. an actual value of the roller speed $n_{RL}$, $n_{RR}$ or of the roller torque $M_{RL}$, $M_{RR}$, which can be determined on the test bench 11 using suitable speed sensors. The target dyno values $S_{DL}$, $S_{DR}$ are determined again in a simulation. The simulation preferably takes into account the property inherent in the roller test bench that the roller 41 is a friction gear and the roller 41 and the tread shuffle L of the tire 41 have a relative velocity (tire slippage) that is dependent upon the overall system dynamics. Accordingly, the roller test bench can adjust a shuffle speed. Thus on both types of test bench, on the roller test bench and on the drive train test bench, it is possible to implement tire slippage that exists on any kind of driving surface in the real world.

Normally, an actual value of the roller torque $M_R$ (or $M_{RL}$, $M_{RR}$ for two rollers 41) is made available on the roller test bench and is detected on the test bench 11 by means of suitable sensors. Based on the Eulerian equation of motion for a roller 41, the following relationship arises directly from the basic inventive idea that only certain values of the tire wrench influence the rotational movement, especially the longitudinal force $F_x$ and the rolling resistance torque $M_y$:

$$J_R \ddot{\alpha} = M_y + F_x r_x + M_R + M_{aux}$$

with the known roller radius $R_r$, the mass moment of inertia of the roller $J_R$ and the rotational acceleration of the roller $\ddot{\alpha}_R$ relative to a stationary reference system and any arbitrary additional torque $M_{aux}$, such as aerodynamic and friction losses of the roller, etc.

In the first simulation unit 30, a first simulation model 31 is again implemented with a vehicle model 32 and a first tire model 33 (or multiple first tire models 33 in the case of multiple tires 1, as is indicated in FIG. 5). The longitudinal velocity $v_x$ of the wheel contact point P, and possibly values of the tire wrench that do not directly influence the rotational movement of the tire 1, are calculated again with the first simulation model 31.

The values of the tire wrench that directly influence the rotational movement of the tire 1, namely the longitudinal force $F_x$ and/or the rolling resistance torque $M_y$, are again calculated with the second simulation model 36 that is implemented in the second simulation unit 35 (or multiple second simulation models 36 in the case of multiple tires 1, as is shown in FIG. 5), preferably a second tire model again. For this purpose, the two values can be obtained from the simulation with the second simulation model 36, as was explained earlier with reference to FIG. 3. Alternatively, the two values could also be calculated from the Eulerian equation of motion shown above. If the simulation then calculates or estimates one of the two values of longitudinal force $F_x$ and rolling resistance torque $M_y$, then the respective missing second value can be calculated from the above equation of motion as a simulation from the measured values of the roller torque $M_R$ and the rotational acceleration $\ddot{\alpha}_R$ of the roller 41. As is explained above, calculating just one of the two values, longitudinal force $F_x$ or rolling resistance torque My, can be sufficient to determine the target dyno value $S_D$.

The values measured or estimated in this way are generally fed back to the first simulation unit 30.

Additionally, second-order effects that arise from the camber and the skew of the vehicle wheels 40 can also be taken into account on the roller test bench. To do so, correction terms could be defined which correct the values longitudinal force $F_x$ and/or rolling resistance torque $M_y$ as a function of the current camber and/or the current skew, which can be measured or can also be known from the test run or simulation model of the vehicle. The correction terms can be determined from known and prescribed models, characteristic curves or characteristic diagrams. In principle, a correction such as this could also be possible in an arrangement according to FIG. 2, such as when the camber and the skew in the first simulation model 31 are taken into account, e.g. by means of suitable simulation models of the vehicle wheels.

The roller 41 and the tire tread shuffle have a relative velocity, the so-called tire slippage, that is dependent upon the overall system dynamics. From the detected tire wrench of the tire or tires 1 of the vehicle, a target shuffle speed of the tire 1 can be calculated in the second simulation unit 35 from an inverse tire model in a way that is known per se. Using the target shuffle speed of the tire 1 and a tread shuffle model, which incorporates the friction physics of the friction gear roller/tire shuffle, a target shuffle speed of the roller 41 is formed, which can be provided to the drive control unit 34 as the target dyno value $S_D$. A known slippage curve, for example, can be drawn upon as a tread shuffle model, which takes into account camber, toe-in, vertical force $F_z$ and the influences of temperature. The roller test bench can therefore also adjust a shuffle speed in a model-based way when the wheel speed is not measured directly.

A further aspect of the invention lies in the fact that tire losses can also be considered. For instance, the power loss in the tire 1 is dependent upon the rolling resistance torque $M_y$ and the longitudinal force $F_x$ because of the tire slippage. This power loss can be taken into account during the simulation, in particular at a time when the real losses in the friction gear of the roller test bench are different from those in the virtually simulated driving environment. To this end, it could be possible that, in the first simulation model 31 or in the vehicle model 32 of the vehicle, this power loss is considered in the first simulation unit 30 to calculate the propulsive power of the vehicle. Either a power loss is calculated in the second simulation unit 35 and is provided to the first simulation unit 30, or the longitudinal force $F_x$ and/or the rolling resistance torque My are transferred directly to it.

In this context, it is most especially advantageous that the tire losses caused by cornering or as a result of uneven driving surfaces can also be taken into account on the roller test bench. For example, cornering leads to a skew angle of the vehicle wheel 40 that is taken into account in the first simulation unit 30. The power loss increases with the skew angle, wherein this relationship is known and can be illustrated by a formula or a model. This makes it possible to account in the first simulation model 31 for tire losses caused by cornering (possibly with correction terms again), whereby realistic test runs with cornering can be performed on the test bench 11.

Of course, the longitudinal force $F_x$ and/or the rolling resistance torque $M_y$ can also be transferred directly to the drive control unit 34 as the target dyno value $S_D$. The drive control unit 34 could then directly utilize the longitudinal force $F_x$ and/or the rolling resistance torque $M_y$ to activate the load machine 17. In this case, the target dyno value $S_D$ is also determined at the same time as the calculation of the longitudinal force $F_x$ and/or the rolling resistance torque $M_y$.

It emerges from the above statements that the longitudinal velocity $v_x$ is calculated for a tire 1 in the first simulation unit 30 with the first simulation model 31 or a first tire model 33 and is transmitted to the second simulation unit 35. Of course, other equivalent values could also be calculated, from which the longitudinal velocity $v_x$ can be directly derived. This is also understood to be a calculation of the longitudinal velocity $v_x$ within the meaning of the invention. Note as an example the case in which, instead of the longitudinal velocity $v_x$, the projection of V(P) onto the longitudinal and transverse axes of the vehicle as well as the toe-in are calculated in the first simulation unit 30 and transmitted to the second simulation unit 35, which could directly derive the longitudinal velocity $v_x$ from this.

It emerges from the above statements that the vertical force $F_z$ can also be calculated for a tire 1 in the first simulation unit 30 with the first simulation model 31 or a first tire model 33. Of course, other equivalent values could also be calculated, from which the vertical force $F_z$ can be directly derived. This is also understood to be a calculation of the vertical force $F_z$ within the meaning of the invention. An example to note here is a linear force law of the tire 1 in the form $F_z = z \cdot c\ [+\dot{z} \cdot d]$. Here z stands for the tire deflection at a particular point in time, and c stands for a modulus of resilience of the tire 1. Optionally, a damping term with a damping constant d could also be considered. In this way, the tire deflection z could be calculated equal to the vertical force $F_z$ in the first simulation unit 30 and provided to the second simulation unit 35, which could directly derive the vertical force $F_z$ from it.

The invention claimed is:

1. A method for performing a test run on a test bench, comprising:
   loading a test specimen by a load machine, said load machine is controlled by a drive control unit, and the drive control unit uses at least one target dyno value, which must be set, to control the load machine,
   calculating at least one longitudinal velocity of a tire in a first simulation unit with a first simulation model and providing the longitudinal velocity to a second simulation unit, the at least one longitudinal velocity of the tire is a speed of a wheel contact point,
   calculating a longitudinal force and/or a rolling resistance torque of the tire in a second simulation unit with a second simulation model, separate from the first simulation model, on the basis of the longitudinal velocity calculated by the first simulation unit, and
   determining the at least one target dyno value for the drive control unit with the longitudinal force and/or the rolling resistance torque.

2. The method according to claim 1, wherein at least one of the values vertical force, transverse force, drilling torque and tilting torque of the tire are calculated in the first simulation unit and provided to the second simulation unit for the calculation of the longitudinal force and/or rolling resistance torque.

3. The method according to claim 2, wherein the at least one target dyno value for the drive control unit is calculated from the longitudinal force and/or rolling resistance torque in the second simulation unit.

4. The method according to claim 1, wherein the at least one target dyno value for the drive control unit is calculated from the longitudinal force and/or rolling resistance torque in the second simulation unit.

5. The method according to claim 1, wherein at least one of the values longitudinal velocity, vertical force, transverse force, drilling torque and tilting torque is calculated in the first simulation unit at a first frequency, and the longitudinal force and/or the rolling resistance torque are calculated from these values in the second simulation unit at a second frequency.

6. The method according to claim 5, wherein the first frequency is shorter than the second frequency.

7. The method according to claim 1, wherein the second simulation model is implemented in the drive control unit.

8. The method according to claim 1, wherein the values longitudinal force and/or rolling resistance torque are corrected as a function of a current camber and/or current skew of the tire.

9. The method according to claim 1, wherein a tire slippage, which depends on the longitudinal force, is taken into account in the first simulation model and/or in the second simulation model during the simulation.

10. The method according to claim 1, wherein a roller test bench is employed as the test bench, and at least one tire is frictionally connected with a roller that is driven by the load machine.

11. The method according to claim 10, wherein a rolling resistance torque of the roller is measured and the longitudinal force or the rolling resistance torque is calculated from the second simulation model in the second simulation unit, and the respective other value is calculated from an equation of motion.

12. The method according to claim 11, wherein a shuffle speed is calculated as the target dyno value, and it adjusts the roller as a friction gear by means of the frictional connection.

13. The method according to claim 10, wherein a shuffle speed is calculated as the target dyno value, and it adjusts the roller as a friction gear by means of the frictional connection.

14. A device for controlling a test bench for performing a test run, comprising:
- a test specimen constructed on the test bench and the test specimen is connected to a load machine,
- a drive control unit provided to set a target dyno value on the load machine,
- a first simulation unit with a first simulation model and a second simulation unit with a second simulation model, separate from the first simulation model,
- wherein the first simulation model calculates at least one longitudinal velocity of a tire and provides it to the second simulation unit, the at least one longitudinal velocity of the tire is a speed of a wheel contact point, and
- the second simulation unit calculates a longitudinal force and/or a rolling resistance torque of the tire based on the longitudinal velocity calculated by the first simulation unit, and determines at least one target dyno value for the drive control unit from that information.

15. The device according to claim 14, wherein at least one of the values vertical force, transverse force, drilling torque and tilting torque of the tire are calculated in the first simulation unit and provided to the second simulation unit for the calculation of the target dyno value for the drive control unit.

16. The device according to claim 15, wherein at least one of the values longitudinal velocity, vertical force, transverse force, drilling torque and tilting torque of the tire is calculated in the first simulation unit at a first frequency, and the longitudinal force and/or the rolling resistance torque are calculated from these values in the second simulation unit at a second frequency.

17. The device according to claim 14, wherein at least one of the values longitudinal velocity, vertical force, transverse force, drilling torque and tilting torque of the tire is calculated in the first simulation unit at a first frequency, and the longitudinal force and/or the rolling resistance torque are calculated from these values in the second simulation unit at a second frequency.

18. The device according to claim 17, wherein the first frequency is shorter than the second frequency.

19. The device according to claim 14, wherein the drive control unit is provided as the second simulation unit, and the second tire model is implemented in the drive control unit.

20. A test bench, comprising:
- a load machine connected to a test specimen on the test bench;
- a first simulation unit having a first simulation model, the first simulation unit calculating a longitudinal velocity of a tire, the longitudinal velocity of the tire is a speed of a wheel contact point;
- a second simulation unit having a second simulation model, separate from the first simulation model, the second simulation unit calculating a longitudinal force and/or a rolling resistance torque of the tire based on the longitudinal velocity of the tire calculated by the first simulation unit;
- a drive control unit setting a target dyno value on the load machine, the target dyno value calculated using the longitudinal force and/or the rolling resistance torque of the tire.

* * * * *